(12) United States Patent
Gillett et al.

(10) Patent No.: US 8,881,694 B2
(45) Date of Patent: Nov. 11, 2014

(54) GENERATOR SET ASSEMBLY WITH BAFFLE

(75) Inventors: Daniel D. Gillett, Mounds View, MN (US); Shawn J. Kipka, Saint Francis, MN (US)

(73) Assignee: Cummins Power Generation IP, Inc., Minneapolis, MN (US)

( * ) Notice: Subject to any disclaimer, the term of this patent is extended or adjusted under 35 U.S.C. 154(b) by 141 days.

(21) Appl. No.: 13/323,415

(22) Filed: Dec. 12, 2011

(65) Prior Publication Data
US 2013/0147203 A1    Jun. 13, 2013

(51) Int. Cl.
*F01P 7/14*    (2006.01)
*F01P 7/16*    (2006.01)

(52) U.S. Cl.
CPC .............. *F01P 7/16* (2013.01); *F01P 2025/62* (2013.01)
USPC ...................................................... 123/41.1

(58) Field of Classification Search
CPC ....... F01P 7/16; F01P 7/167; F01P 2007/146; F01P 2060/08; F01P 2025/62
USPC ...................................................... 123/41.1
See application file for complete search history.

(56) References Cited

U.S. PATENT DOCUMENTS

| | | | | |
|---|---|---|---|---|
| 4,245,621 A | * | 1/1981 | Hollobaugh | 126/621 |
| 4,835,405 A | * | 5/1989 | Clancey et al. | 290/1 A |
| 5,890,460 A | * | 4/1999 | Ball et al. | 123/41.7 |
| 5,899,174 A | * | 5/1999 | Anderson et al. | 123/2 |
| 7,692,409 B2 | * | 4/2010 | Schaper et al. | 320/157 |
| 2006/0144637 A1 | * | 7/2006 | Swartz et al. | 181/198 |
| 2008/0042625 A1 | * | 2/2008 | Konop et al. | 322/1 |
| 2010/0102684 A1 | * | 4/2010 | Dykes | 310/68 R |

FOREIGN PATENT DOCUMENTS

WO    WO 2010060482 A1 *    6/2010

* cited by examiner

*Primary Examiner* — Lindsay Low
*Assistant Examiner* — Charles Brauch
(74) *Attorney, Agent, or Firm* — Foley & Lardner LLP

(57) ABSTRACT

An apparatus includes a housing having a ventilation opening. A component such as a generator set can be disposed within an interior space of the housing. A baffle can be disposed within the interior space of the housing at a location that obstructs an acoustic line of sight between the ventilation opening and the component to eliminate or otherwise reduce a sound signature of the component. The baffle can also be configured to accumulate water from the ventilation opening. A drain can also be provided to aid in the removal of water accumulated by the baffle and route the water outside the housing.

25 Claims, 4 Drawing Sheets

GENERATOR SET ASSEMBLY WITH BAFFLE

GOVERNMENT RIGHTS

The present invention was made under U.S. Department of Defense (DOD) contract Number FA8533-09-D-0004 for the U.S. Air Force. The Government has certain rights in the invention.

BACKGROUND

The present application is directed to unique apparatus, systems, and methods involving generator set generator driven by an engine.

A generator set (also known as a "genset") typically includes an engine and an electric power generator coupled to the engine. The engine is structured to mechanically drive the generator which, in turn, can produce electricity. Genset implementation varies greatly, including both mobile and stationary applications, primary and standby/backup power, controlled and uncontrolled environments, and the like. In many applications it is desired that the genset operate outdoors, being able to tolerate environmental extremes of temperature, humidity, precipitation (e.g., rain, snow, ice, etc.), and the like. Alternatively or additionally, there is often a desire to minimize noise emanating from the genset, while maintaining a sufficiently small genset form factor; to improve genset efficiency, maintainability, reliability, and/or manufacturability; to provide operator-friendly input/output genset interfacing; to facilitate shipping and/or installation; and other sought-after features. Accordingly, there remains an ongoing need for further contributions in this area of technology.

SUMMARY

One embodiment exemplarily disclosed herein is a unique apparatus incorporating a component such as a generator set. Other embodiments include unique apparatus, systems, devices, and methods for protecting components from environmental elements such as water while also minimizing a sound-signature produced by the components. Further embodiments, forms, features, aspects, benefits, and advantages of the present application shall become apparent from the description and figures provided herewith.

DETAILED DESCRIPTION OF REPRESENTATIVE EMBODIMENTS

Figure 1:
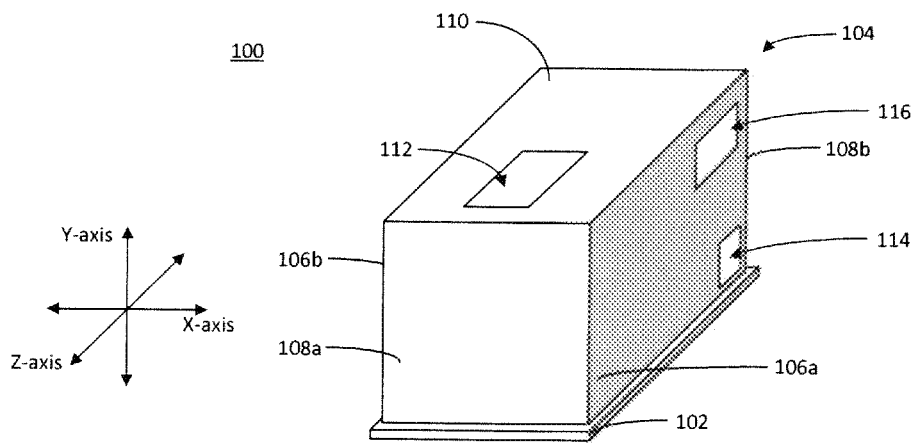
FIG. 1 is a perspective view diagrammatically illustrating an apparatus including a housing for a component such as a generator set, according to one embodiment.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

A generator set assembly is disclosed that includes a housing defining an interior which at least partially houses a generator set. The housing includes an upper portion that defines at least one ventilation air opening through which, for example, air from the interior is exhausted. A baffle is positioned in the interior of the housing between the generator set and the air opening to re-direct or route noise from the generator set around the baffle, increasing the distance of travel of the noise in the housing and reducing sound levels of the generator set exterior to the housing. Due to the positioning of the air opening, water may be transmitted to the interior of the housing. The baffle also directs the water and can be connected to a drain to outlet water to the exterior of the housing.

Referring to FIG. 1, an apparatus, such as a generator set assembly 100, can include a frame 102 and a housing 104 disposed on the frame 102. In one embodiment, the housing 104 can be coupled to the frame 102 by any suitable means (e.g., by welding, fasteners, bolts, clamps, rivets, or the like or a combination thereof). As will be described in greater detail below, the generator set assembly 100 may also include one or more components disposed within an interior space of the housing 104. These components may be supported by the frame 102. However, it should be appreciated that while housing 104 is frame supported in the depicted embodiment, in other embodiments housing 104 may not be supported by frame 102.

The housing 104 can include a plurality of walls and a roof structure extending between the walls to define a substantially enclosed space. The walls include panels or other suitable structure to define side portions of housing 104, such as first side portion 106a, second side portion 106b, third side portion 108a and fourth side portion 108b. The roof structure includes one or more panels or other suitable structure to define an upper portion of housing 104, such as upper portion 110. As exemplarily illustrated, the first side portion 106a is spaced apart from the second side portion 106b, the third side portion 108a is spaced apart from the fourth side portion 108b, and the upper portion 110 is coupled to the upper ends of first side portion 106a, the second side portion 106b, the third side portion 108a and the fourth side portion 108b. Constructed as exemplarily described above, the interior space of the housing is defined by interior surfaces of the first side portion 106a, the second side portion 106b, the third side portion 108a, the fourth side portion 108b, and the upper portion 110.

In one embodiment, the upper portion 110 and each side portion 106a, 106b, 108a and 108b are provided as one or more individual panels that are coupled together directly (e.g., by welding, fasteners, interlocking parts, or the like or a combination thereof). In another embodiment, however, the individual panels of the upper and side portions can be coupled to one or more common support structures such as beams or columns (not shown) (e.g., by welding, fasteners, interlocking parts, or the like or a combination thereof), thereby indirectly coupling the individual panels together. In one example, the individual panels of the upper portion and side portions can be coupled together as exemplarily described in U.S. Provisional Patent Application No. 61/248,849 (hereinafter, "the '849 application"), filed on Oct. 5, 2009, in U.S. patent application Ser. No. 12/924,774 (hereinafter, "the '774 application"), filed on Oct. 5, 2010, in U.S. patent application Ser. No. 12/924,775 (hereinafter, "the '775 application"), filed on Oct. 5, 2010, and/or in U.S. patent application Ser. No. 12/924,806 (hereinafter, "the '806 application"), filed on Oct. 5, 2010, each of which is herein incorporated by reference in its respective entirety. In another embodiment, however, one or more of the first side portion 106a, the second side portion 106b, the third side portion 108a, the fourth side portion 108b, and the upper portion 110 may be provided a single, integrally-formed piece. One or more of the first side portion 106a, the second side portion 106b, the third side portion 108a, the fourth side portion 108b, and the upper portion 110 may be formed of any suitable material or combinations of materials for a genset housing. In one embodiment, interior surfaces of the first side portion 106a, the second side portion 106b, the third side portion 108a, the fourth side portion 108b, and/or the upper portion 110 may be lined with a sound-absorbing material (e.g., to reduce a sound signature of the generator set assembly 100).

Although FIG. 1 illustrates the first side portion 106a, the second side portion 106b, the third side portion 108a, the fourth side portion 108b, and the upper portion 110 as being substantially planar, it will be appreciated that any of these portions can be bent, curved, planar, angular, or the like, or a combination thereof, and may have any desired surface texture. Further, although FIG. 1 illustrates the housing 104 as including only four side portions, it will be appreciated that the housing 104 can be provided with any number of side portions. Furthermore, housing 104 may include multiple upper portions forming a non-planar arrangement.

The housing 104 can include openings that communicate with or open into the interior of housing 104. For example, the upper portion 110 can include a ventilation air exhaust opening 112. Further, the first side portion 106a can include a ventilation air intake opening 114 and an access opening such as interface access opening 116. Although not illustrated, one or more of the openings 112, 114 and 116 can be provided with a debris barrier to prevent unwanted objects such as dust, leaves, stones, branches, and other debris from entering into the interior space of the housing 104. As an example, a debris barrier can include a grille, a louver (e.g., removable, permanently attached, etc.), a louver assembly (e.g., adjustable, fixed, permanently attached, removable, etc.), a door, a screen, or the like or a combination thereof.

As will be discussed in greater detail below, the ventilation air exhaust opening 112 is structured such that air (e.g., ventilation air) within the interior space of the housing 104 can flow outside the housing 104. However, water (e.g., dew, drizzle, rain, sleet, snow, hail, ice, or the like or a combination thereof) can also enter into the interior space of the housing 104 through the ventilation air exhaust opening 112. The ventilation air intake opening 114 is structured such that ventilation air can be drawn into the interior space of the housing 104 from outside the housing 104. As will also be discussed in greater detail below, the interface access opening 116 is structured to permit a user to access an interface of a control system from outside the housing 104.

Although FIG. 1 illustrates the first side portion 106a as including one ventilation air intake opening 114, it will be appreciated that the first side portion 106 may include any number of ventilation air intake openings 114. Likewise, any of the side portions 106a, 106b, 108a and 108b and/or the upper portion 110 may include any number of ventilation air intake openings 112, or any other type of opening. Similarly, although FIG. 1 illustrates the first side portion 106 as including the interface access opening 116, it will be appreciated that the interface access opening be provided in any side portion 106a, 106b, 108a or 108b and/or 110. In one example, the side portion 106a, 106b, 108a and 108b, and 110, can be provided with openings such as those exemplarily described in the '849 application, the '774 application, the '775 application, and/or the '806 application.

Figure 2:
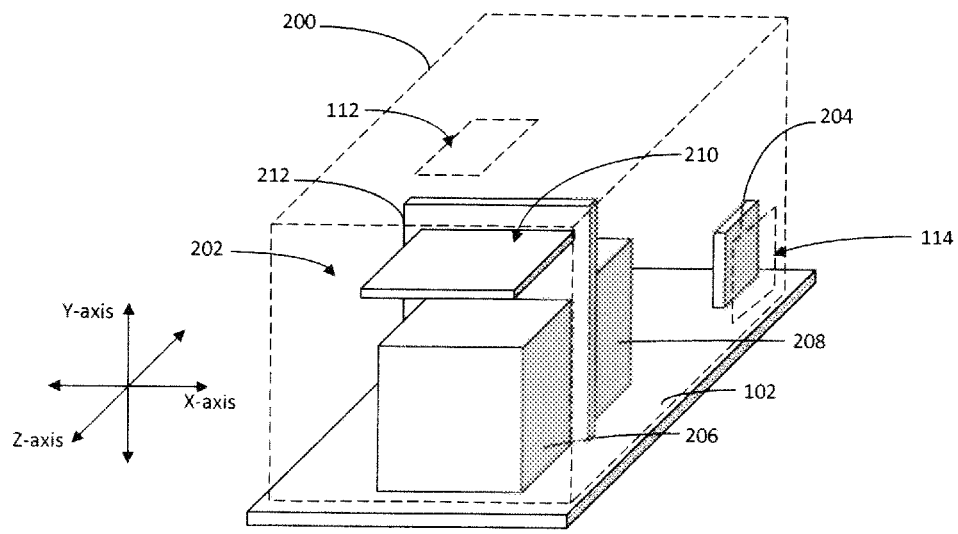
FIG. 2 is a perspective view diagrammatically illustrating a baffle according to one embodiment, and an exemplary arrangement of some exemplary components that can be disposed within an interior space of the housing shown in FIG. 1.

Referring to FIG. 2, one or more components can be supported by the frame 102 and disposed, either completely or partially, within an interior space (identified by dashed box 200) of the housing 104 (not shown for clarity). Exemplary components illustrated in FIG. 2 include a generator set 202 and a cooling fan 204. Although the generator set 202 is illustrated as being completely disposed within the interior space 200, it will be appreciated that the generator set 202 can alternatively be only partially disposed within the interior space 200.

The generator set 202 includes components such as an engine 206 and an electric power generator 208. In one embodiment, the engine 206 is coupled to the electric power generator 208 by, for example, a drive shaft (not shown). In operation, the engine 206 drives the electric power generator 208 to produce electricity. The engine 206 can be provided as any desired engine (e.g., a gasoline internal combustion engine, a diesel internal combustion engine, a gas turbine engine, or the like). In one example, the engine 206 and electric power generator 208 can be provided and operated as exemplarily described in the '849 application, the '774 application, the '775 application, and/or the '806 application.

In one embodiment, the cooling fan 204 is disposed at a location adjacent to the ventilation air intake opening 114 and is structured to draw air (e.g., ventilation air) from outside the housing 104 into the interior space 200 through the ventilation air intake opening 114. In one embodiment, ventilation air drawn into the interior space 200 by the cooling fan 204 can be warmed by heat generated during operation of the generator set 202. The warmed ventilation air can then be exhausted to the environment outside the housing 104 through the ventilation air exhaust opening 112. Thus, the cooling fan 204 can be operated to help maintain a temperature within the interior space 200 to be at or near a suitable operating temperature for the generator set 202 (e.g., about 90.5 degrees Celsius). Although FIG. 2 illustrates only one cooling fan 204, it will be appreciated that any number of cooling fans 204, of any type, can be disposed within the interior space 200. In one example, one or more cooling fans 204 can be provided and operated as exemplarily described in the '849 application, the '774 application, the '775 application, and/or the '806 application.

Figure 3:
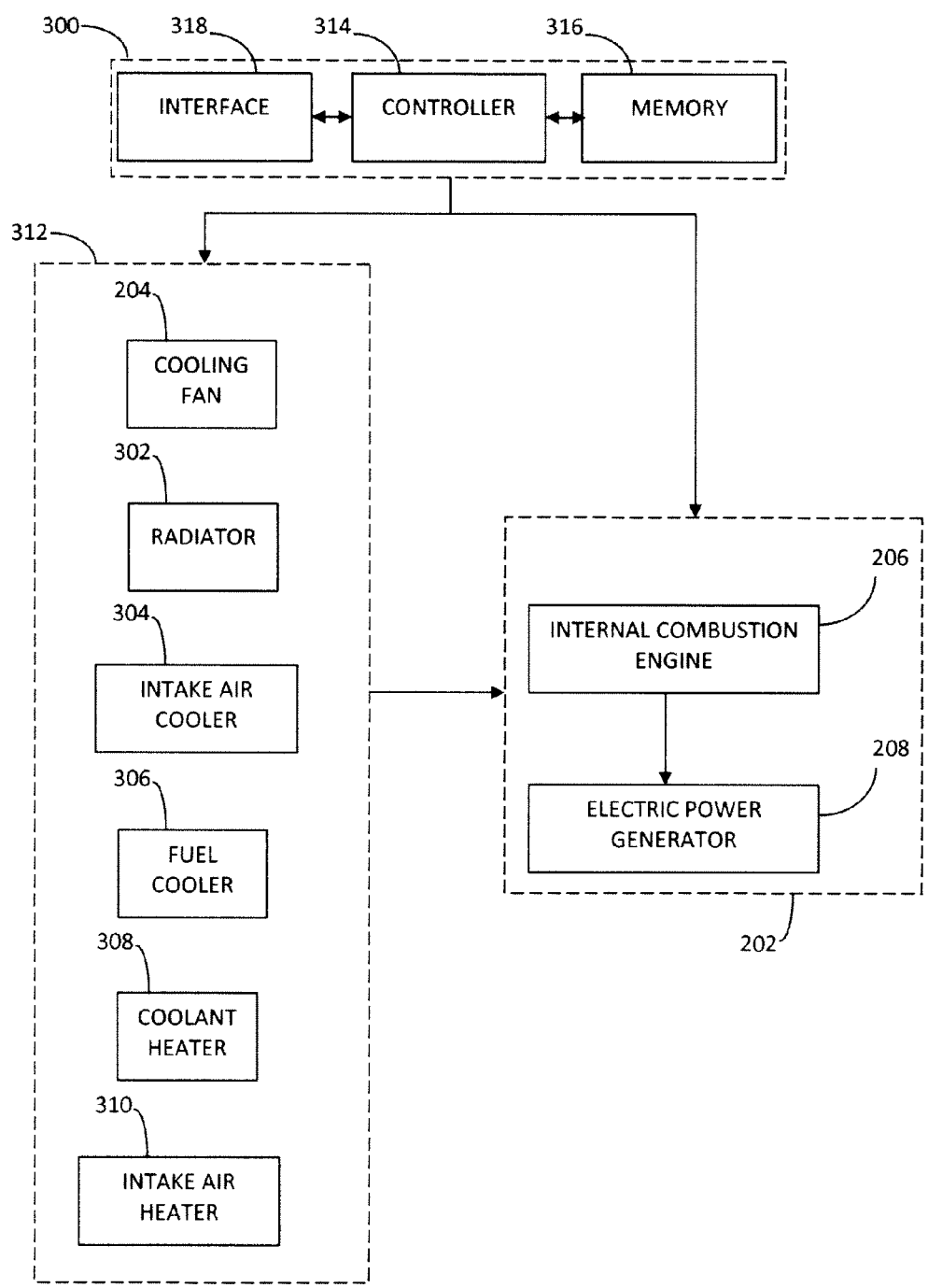
FIG. 3 is a diagram schematically illustrating a control system and components associated with the generator set shown in FIG. 2.

Although FIG. 2 only illustrates a generator set 202 and a cooling fan 204 as exemplary components that may be disposed within the interior space 200, it will be appreciated that other components can be disposed, either completely or only partially, within the interior space 200. For example, and with reference to FIG. 3, such other components may include a control system 300, a radiator 302, an intake air cooler 304, a fuel cooler 306, a coolant heater 308, and an intake air heater 310. It will nevertheless be appreciated that more or fewer components can be disposed within the interior space 200. Collectively, components such as the cooling fan 204, the radiator 302, the intake air cooler 304, the fuel cooler 306, the coolant heater 308 and the intake air heater 310 may be considered as part of a temperature regulation system 312. Although not illustrated, one or more additional components such as a temperature sensor, a humidity sensor, a thermostat, or the like, may be operatively coupled to the temperature regulation system 312, the generator set 202, the cooling fan 204, or the like or a combination thereof, to support operations of the temperature regulation system 312, the generator set 202, or the like.

Generally, the radiator 302 acts as a heat exchanger for coolant (e.g., water, antifreeze, etc.) that circulates through, for example, an engine block of the engine 206. In one embodiment, the intake air cooler 304 can be structured to dissipate heat from compressed air exiting a turbocharger into the interior space 200 before the compressed air enters the engine 206. As a result, the intake air can be cooled and the operating efficiency of the engine 206 can be relatively improved. In one embodiment, the fuel cooler 306 can be structured to cool fuel before the fuel is injected into the engine 206, thereby permitting the operating efficiency of the engine 206 to be relatively improved. In one example, the radiator 302, the intake air cooler 304 and the fuel cooler 306 can be provided and operated as exemplarily described in the '849 application, the '774 application, the '775 application, and/or the '806 application.

In one embodiment, the cooling fan 204 and one or more of the radiator 302, the intake air cooler 304 and the fuel cooler 306 can be structured and arranged within the interior space 200 such that ventilation air drawn into the interior space 200 by the cooling fan 204 passes over the radiator 302, the intake air cooler 304 and/or the fuel cooler 306, thereby transferring heat from the radiator 302, the intake air cooler 304 and/or the fuel cooler 306 to the ventilation air. The warmed ventilation air can then be exhausted to the environment outside the housing 104 through the ventilation air exhaust opening 112. Thus, the cooling fan 204 and one or more of the radiator 302, the intake air cooler 304 and the fuel cooler 306 can be operated to help maintain temperatures of coolant, intake air and/or fuel supplied to the engine 206 to be at or near suitable operating temperatures.

In one embodiment, the coolant heater 308 can be structured to heat coolant when the temperature inside or outside the housing 104 is extremely cold (e.g., in a range from −32 degrees Celsius to −46 degrees Celsius). The coolant heater can structured to heat coolant by using (e.g., burning) fuel used during operation of the engine 206. In one embodiment, the air intake heater 310 can be structured to warm air in a combustion chamber of the engine 206 when the intake air is otherwise too cold (e.g., in a range from −6 degrees Celsius to −32 degrees Celsius) for effective ignition within the engine 206. In one example, the coolant heater 308 and the air intake heater 310 can be provided and operated as exemplarily described in the '849 application, the '774 application, and/or the '775 application.

As exemplarily illustrated, the control system 300 may, for example, include a controller 314 coupled to the memory 316, and an interface 318 coupled to the controller 314. The controller 314, memory 316, and interface 318 may be variously coupled together by any suitable wired or wireless communication means. In one embodiment, each of the controller 314, memory 316, and interface 318 can be disposed, either completely or partially, within the interior space 200. In another embodiment, a component such as the memory 316 may be disposed outside the housing 104, local to or remote from the generator set assembly 100.

Generally, the controller 314 is structured to control the operation of one or more the components disposed within the interior space 200. For example, the controller 314 can be structured to control an operation of the generator set 202, an operation of one or more components of the temperature regulation system 312, or the like or a combination thereof. In one embodiment, the controller 314 includes a processor (not shown) that is configured to execute operating logic defining various control, management, operation, and/or regulation functions. This operating logic may be in the form of dedicated hardware, such as a hardwired state machine, programming instructions, and/or a different form as would occur to those skilled in the art. The processor may be provided as a single component, or a collection of operatively coupled components. The processor may include digital circuitry, analog circuitry, or a combination thereof. When of a multicomponent form, the processor may have one or more components remotely located relative to the others. The processor can include multiple processing units arranged to operate independently, in a pipeline processing arrangement, in a parallel processing arrangement, and/or such different arrangement as would occur to those skilled in the art. In one embodiment, the processor is a programmable microprocessing device of a solid-state, integrated circuit type that includes one or more processing units and memory. The processor can include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, and/or different circuitry or functional components as would occur to those skilled in the art to perform any desired control, management, operation and/or regulation functions. In one example, the controller 314 can be provided and operated as exemplarily described in the '849 application, the '774 application, the '775 application, and/or the '806 application.

Generally, the memory 316 is structured to store data relating to operating parameters of components of the generator set assembly 100 (e.g., of the generator set 202, of one or more components of the temperature regulation system 312, or the like or a combination thereof), instructions, operation commands, algorithms, and any other information or data associated with any aspect of the generator set assembly 100, including its operation, maintenance, and the like. In one embodiment, the memory 316 includes one or more components and can be of any volatile or nonvolatile type, including the solid state variety, the optical media variety, the magnetic variety, any combination of these, or such different arrangement as would occur to those skilled in the art. In one example, the memory 316 can be provided and operated as exemplarily described in the '849 application, the '774 application, and/or the '775 application.

Generally, the interface 318 is coupled to the controller 314 and is structured and arranged so as to be accessible from outside the housing 104 through the access opening 116. In one embodiment, the interface 318 is structured to control an operation of the controller 314 (e.g., upon being engaged by a user or operator of the generator set assembly 100). In one embodiment, the interface 318 can be engaged to cause the controller 314 to display, print, transmit, or otherwise make available to the user, the operator, or any other entity, data or information stored within the memory 316. Accordingly, the interface 318 may include a display panel (e.g., a cathode ray tube, a liquid crystal display panel, a light emitting diode display panel, a touchscreen display panel, an indicator lamp, or the like or a combination thereof), an electrical communication port (e.g., a serial port, a parallel port, a Universal Serial Bus port, a FireWire port, an Ethernet port, or the like or a combination thereof), an optical communication port, a keypad, a push-button, a knob, and a switch. In one example, the interface 318 can be provided and operated as exemplarily described in the '849 application, the '774 application, and/or the '775 application.

Referring back to FIG. 2, and as mentioned above, the ventilation air exhaust opening 112 is structured to allow ventilation air within the interior space 200 to flow outside the housing 104. As exemplarily illustrated, components such as the engine 206 can be disposed within the interior space 200 such that an acoustic line of sight exists between the ventilation air exhaust opening 112 and the engine 206. When an acoustic line of sight exists between the ventilation air exhaust opening 112 and any sound-producing component, such as the engine 206, sound generated by the component can undesirably propagate outside the housing 104 by a direct path from the source of the sound to ventilation air exhaust opening 112. Thus, depending on the component that is disposed within an acoustic line of sight with the ventilation air exhaust opening 112, the sound signature of the generator set assembly 100 can be undesirably high.

To eliminate or otherwise reduce the sound signature of the generator set assembly 100, a sound barrier, such as baffle 210, can be disposed within the interior space 200. In one embodiment, the baffle 210 can be formed from any suitable sound-absorbing material and be structured to obstruct, either completely or only partially, an acoustic line of sight between the ventilation air exhaust opening 112 and at least a portion of the component generating the sound. Accordingly, in the illustrated embodiment, the baffle 210 is positioned in housing 104 to obstruct an acoustic line of sight between the ventilation air exhaust opening 112 and the engine 206. However, it should be appreciated that in other embodiments, baffle 210 is not formed from a sound-absorbing material or is only partially formed from such material. In still other embodiments, baffle 210 may be differently shaped, provided from two or more distinct pieces separate from one another and/or assembled together, or baffle 210 is absent.

The baffle 210 may be coupled to any structure permitting the baffle 210 to be located acoustically between the ventilation air exhaust opening 112 and the sound-producing component. In the illustrated embodiment, for example, the baffle 210 may be mounted to and extend from a structure 212 in interior 200 of housing 104. Structure 212 may be a heat shield, an internal support for other components of the generator set assembly 100, a partition, a divider, a housing support, a dedicated support for baffle 210, or a combination thereof. Further, the structure 212 may have apertures, access openings, or the like extending therethrough. In the illustrated embodiment, the structure 212 may include a drive shaft opening (not shown) configured to allow a drive shaft extend from the engine 206 to the electric power generator 208.

In one embodiment, the baffle 210 may be spaced apart from one or more portions of the housing 104. For example, and with reference to FIGS. 2 and 4, the baffle 210 is spaced apart from the first side portion 106a, the second side portion 106b, and the fourth side portion 108b. In the illustrated configuration, the baffle 210 may be spaced apart from the third side portion 108a, or may contact the third side portion 108a. It will also be appreciated that the baffle 210 may contact one of the first side portion 106a or the second side portion 106b. As exemplarily illustrated in FIG. 4, the width of the baffle 210 (e.g., as measured along the X-axis) and the length of baffle 210 (e.g., as measured along the Z-axis) is selected such that the baffle 210 is partially overlapped by or lies under the upper portion 110 of housing 104 and is larger in size than ventilation air exhaust opening 112. In other embodiments, the baffle 210 may not be overlapped by the upper portion 110 of housing 104. Accordingly, in at least one embodiment, at least a portion of the baffle 210 can be located under the ventilation air exhaust opening 112 such that when housing interior 200 is viewed internally through exhaust opening 112 (e.g., in the direction of the Y-axis) only baffle 210 is visible.

Figure 4:
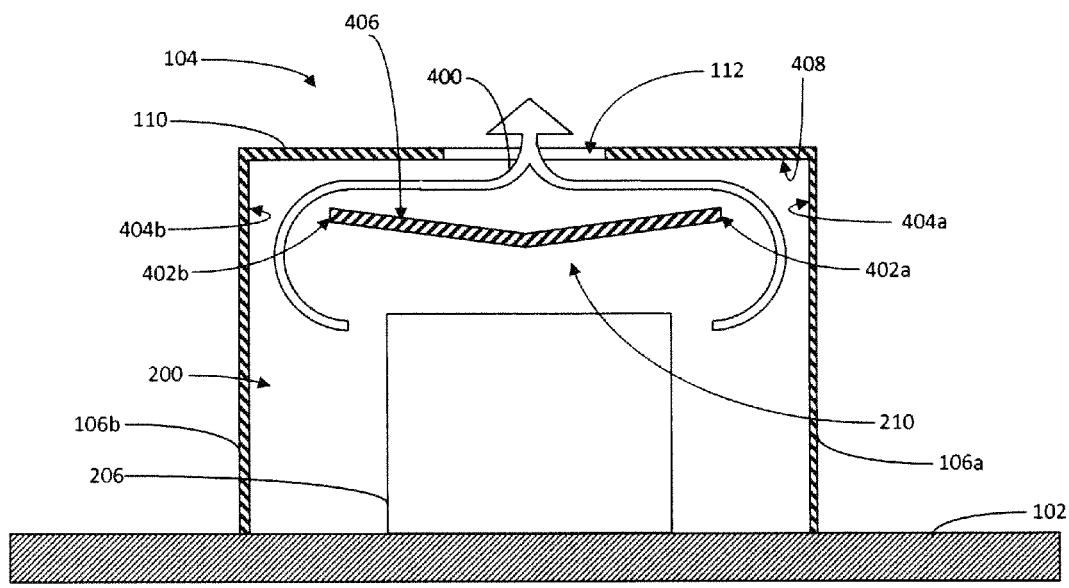
FIG. 4 is a partially schematic, sectional view with an XY view plane perpendicular to the Z-axis in which one embodiment of a baffle disposed within an interior space of a housing.

As best shown in FIG. 4, the baffle 210 creates a labyrinth-like path (identified by arrow 400) along which sound produced by a component (e.g., the engine 206) must travel before exiting the housing 104 through ventilation air exhaust opening 112. Baffle 210 causes the sound to travel an indirect route from the sound-generating component and exhaust opening 112 to increase the distance the sounds travels before exiting housing 104. In the example shown, the labyrinth-like path 400 is delineated by a first space defined between a first edge 402a of the baffle 210 and an interior surface 404a of the first side portion 106a, by a second space defined between a second edge 402b of the baffle 210 and an interior surface 404b of the second side portion 106b and by a third space defined between an upper surface 406 of the baffle 210 and an interior surface 408 of the upper portion 110. The distance between the first edge 402a and interior surface 404a (i.e., the width of the first space), the distance between the second edge 402b and interior surface 404b (i.e., the width of the second space) and the distance between the upper surface 406 and interior surface 408 (i.e., the width of the third space) may be selected as desired to ensure sufficient exhaust of ventilation air and sufficient reduction in sound signature of the generator set assembly 100. Moreover, a distance between the baffle 210 and any sound-producing component, such as the engine 206, below the baffle 210 may be selected as desired to ensure sufficient reduction in sound signature of the generator set assembly 100.

According to some embodiments, the interior space 200 of the housing 104 may or may not be maintained at a positive air pressure relative to the environment outside the housing 104. Nevertheless, and as discussed above, water (e.g., dew, drizzle, rain, sleet, snow, hail, ice, or the like or a combination thereof) can enter into the interior space 200 of the housing 104 through the ventilation air exhaust opening 112. Such intrusion of water into the interior space 200 can cause undesirable corrosion of the generator set assembly 100 as well as potential shorting of electrical components within the housing 104, thereby potentially damaging the generator set assembly 100 and requiring increased maintenance.

To eliminate or otherwise reduce the intrusion of water into the generator set assembly 100, baffle 210 may also function as a water deflector and/or accumulator that is disposed within the interior space 200. In one embodiment, baffle 210 forms a reservoir and thus is structured to accumulate at least a portion of the water entering into the interior space 200 through the ventilation air exhaust opening 112. In the illustrated embodiment, the reservoir is formed by baffle 210, although other embodiments contemplate a baffle that accumulates water that is a separate structure from the sound baffle. In still other embodiment, the baffle 210 does not accumulate water but rather is structured to merely deflect the water and provide a flow path for the water to a drainage structure.

Figure 5:
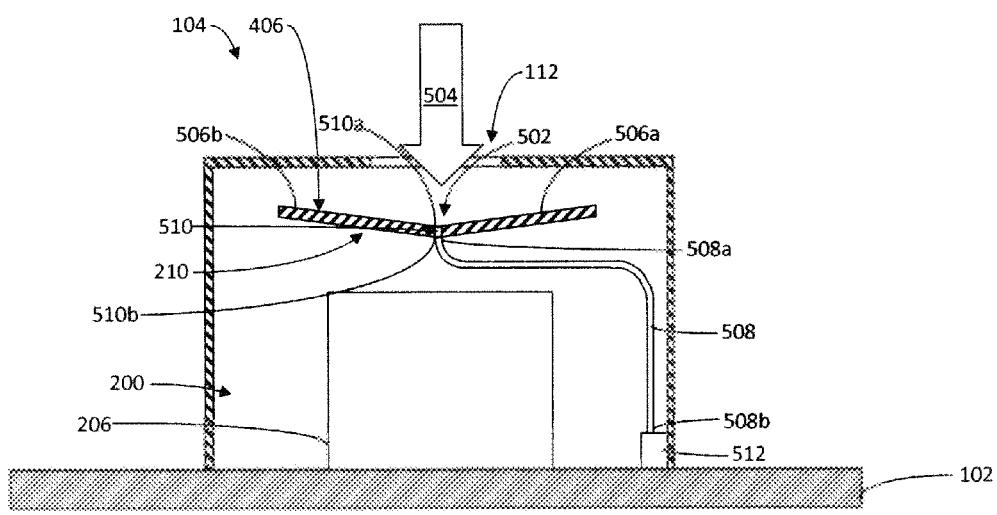
FIG. 5 is a partially schematic, sectional view with an XY view plane perpendicular to the Z-axis further depicting the baffle with a drain for routing water accumulated by the baffle are disposed within an interior space of a housing.

As shown in FIGS. 4 and 5, the upper surface 406 of the baffle 210 faces toward the ventilation air exhaust opening 112 and includes a reservoir region 502 structured to accumulate water that has entered into the interior space 200 through the ventilation air exhaust opening 112 (e.g., indicated by arrow 504). For example, the reservoir region 502 of the upper surface 406 can be structured to provide a low point or area relative to other regions of the upper surface 406 adjacent thereto. By accumulating water within the reservoir region 502, damage to the generator set assembly 100 that would otherwise have been caused by the water can be reduced or eliminated. Although the upper surface 406 of baffle 210 is illustrated as including only one reservoir region 502, it will be appreciated that the upper surface 406 may include any number of reservoir regions 502, which may be provided in any suitable arrangement to collect water. Although not shown, one or more structures may be provided to eliminate or otherwise reduce the likelihood that water will overflow out of the reservoir region 502 and onto components within the interior space 200. For example, auxiliary trays, gutters, channels, storage tanks, or the like or a combination thereof may be disposed at or below one or more peripheral edges of the baffle 210 to catch any overflowing water 504. Alternatively or additionally, a pump (see, for example, the embodiment of FIG. 6) may be used to draw water from the upper surface 406.

As exemplarily illustrated, the upper surface 406 includes a first inclined portion 506a and a second inclined portion 506b, both of which are inclined (e.g., in the direction of the Y-axis relative to the X-axis, as shown in FIG. 1) such that lower regions of the first and second inclined portions 506a and 506b form the reservoir region 502. In one embodiment, the first inclined portion 506a of the upper surface 406 forms an included angle of less than 180 degrees with the second inclined portion 506b of the upper surface 406. Although the first and second inclined portions 506a and 506b of the upper surface 406 are illustrated as being inclined relative to the X-axis, it will be appreciated that one or both of the first and second inclined portions 506a and 506b may also or alternatively be inclined relative to any other axis (e.g., the Z-axis, as shown in FIG. 1) in any manner desired. It will also be appreciated that the upper surface 406 of the baffle 210 may include any number of inclined portions, including only one inclined portion, which may be provided in any desired arrangement and at any desired inclination relative to the X-, Y-, or Z-axis. Furthermore, the perimeter edges 402a, 402b and the edge along side wall portion 108a and/or structure 212 may include a lip or other structure extending upwardly therefrom to prevent water overflow. It will also be appreciated that the upper surface 406 of the baffle 210 may not include any inclined portions.

In one embodiment, water accumulated by the baffle 210 may be at least partially removed through evaporation. For example, heat generated during operation of the generator set 202 can evaporate water accumulated on the upper surface 406 of the baffle 210. The resulting water vapor can then be carried outside the housing 104 through the ventilation air exhaust opening 112, along with the warmed ventilation air. As best illustrated in FIG. 5, a drainage structure, such as drain 508, is provided as an outlet to drain water from the upper surface 406 of the baffle 210.

As exemplarily illustrated, the drain 508 can have a first end 508a and a second end 508b, wherein the first end 508a is in fluid communication with reservoir region 502 of baffle 210 and is structured to receive water accumulated by the baffle 210. In one embodiment, baffle 210 can include a drainage opening 510 having a first end 510a defined in the upper surface 406 of the baffle 210 and a second end 510b defined in some other portion of the baffle 210 (e.g., a lower surface of the baffle 210). The first end 510a of drainage opening 510 can be located in the lowest point or area of reservoir region 502 of the upper surface 406 and the first end 508a of the drain 508 can be connected to second end 510b of the drainage opening 510. In one embodiment, the baffle 210 may include an adapter (not shown) configured to mate with the first end 508a of drain 508 and drainage opening 510.

The drain 508 can be provided as a tube, a conduit, a pipe, a duct, a hose, a channel, or the like or a combination thereof, and be structured such that water received at the first end 508a is movable (under the influence of gravity, via pump operation, or the like) to the second end 508b. It will be appreciated that the second end 508b of drain 508 can be disposed outside the interior space 200 either directly or through a suitable outlet device 512. For example a portion of the drain 508 can extend at least partially through an opening or aperture formed in the frame 102, the housing 104, or the like or a combination thereof. In another embodiment, however, a water outlet device 512, may be disposed within the interior space 200 and be structured to receive water from the second end 508b of the drain 508 to store the water or to convey the received water outside the housing 104 (e.g., through an opening or aperture formed in the frame 102, the housing 104, or the like or a combination thereof) along a water routing path that directs the water away from housing 104.

Figure 6:
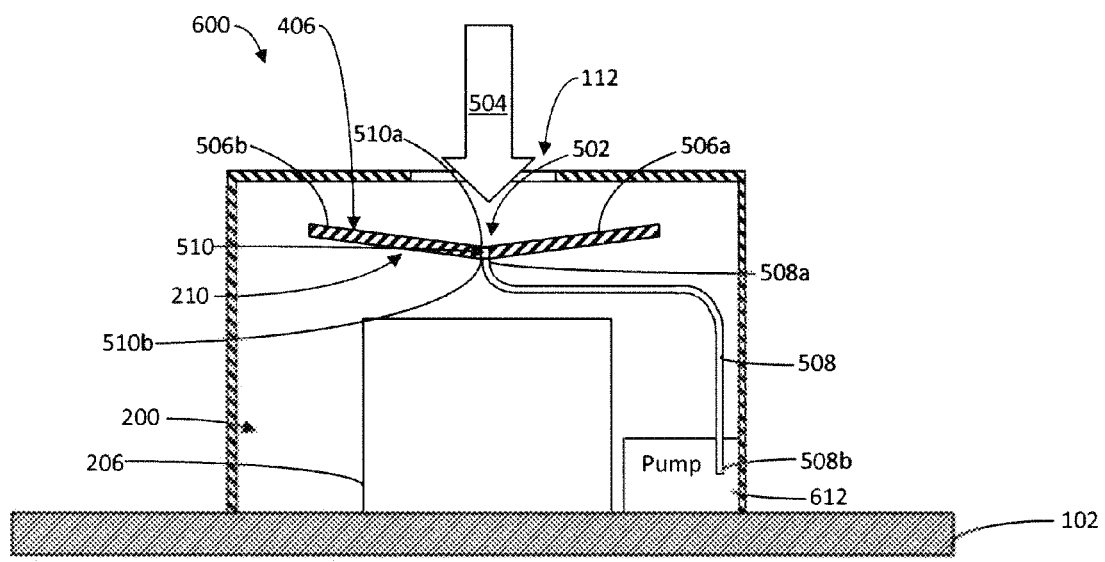
FIG. 6 is a partially schematic, sectional view with an XY view plane perpendicular to the Z-axis of a further embodiment depicting the baffle with a pump for removing accumulated water.

FIG. 6 illustrates generator set assembly 600 of yet another embodiment of the present application; where like reference numerals refer to like features previously described. FIG. 6 is a partially schematic, sectional view like that of FIG. 5 that additionally includes a pump 612. Pump 612 is mechanically and/or electrically powered to draw water away from reservoir region 502 and may be provided with or without a separate drain 508. Assembly 600 may otherwise be configured and/or operated like assembly 100, as described in connection with FIGS. 1-5.

Any theory, mechanism of operation, proof, or finding stated herein is meant to further enhance understanding of embodiments of the present invention and is not intended to make the present invention in any way dependent upon such theory, mechanism of operation, proof, or finding. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary.

While embodiments of the invention have been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:
1. An apparatus, comprising:
a housing including:
 a first side portion, a second side portion, and an upper portion extending between the first side portion and the second side portion;
 a ventilation air intake opening in at least one of the first side portion and the second side portion; and
 a ventilation air exhaust opening defined in the upper portion with an interior space of the housing being at least partially defined by the first side portion, the second side portion, and the upper portion;

a generator set at least partially disposed within the interior space of the housing;

a ventilation fan disposed within the interior space of the housing at a location adjacent to the ventilation air intake opening, the ventilation fan being configured to draw air from outside the housing into the interior space of the housing through the ventilation air intake opening; and a baffle disposed within the interior space of the housing and spaced apart from the upper portion and at least one of the first and second side portions of the housing, wherein the baffle is positioned to obstruct an acoustic line of sight between the ventilation air exhaust opening and at least a portion of the generator set, wherein noise from the generator set is routed around the baffle and between the at least one of the first and second side portions of the housing and the baffle to exit through the ventilation air exhaust opening in the upper portion, and wherein the baffle defines an area facing the upper portion, the area of the baffle being equal to or greater than an area of the ventilation air exhaust opening, and wherein the baffle is mounted to a planar heat shield, the heat shield is disposed in the interior space of the housing, the baffle is perpendicular to and extends from the heat shield.

2. The apparatus of claim 1, wherein the first and second side portions of the housing are spaced apart from each other on opposite sides of the housing, and the upper portion connects the first and second side portions.

3. The apparatus of claim 2, wherein the ventilation air intake opening is formed in the first side portion of the housing.

4. The apparatus of claim 2, wherein a perimeter edge of the baffle is spaced apart from each of the first and second side portions of the housing.

5. The apparatus of claim 1, wherein at least a portion of the generator set is located under the ventilation air exhaust opening, and the baffle is positioned between the portion of the generator set and the ventilation air exhaust opening.

6. The apparatus of claim 1, wherein the generator set includes an engine and an electric power generator coupled to the engine, and wherein the baffle is positioned in an acoustic line of sight between the ventilation air exhaust opening and at least a portion of the generator set.

7. The apparatus of claim 6, wherein the engine is a diesel internal combustion engine.

8. The apparatus of claim 1, wherein the baffle deflects water that is transmitted through the ventilation air exhaust opening into the interior of the housing.

9. The apparatus of claim 8, wherein the baffle includes an upper surface facing the ventilation air exhaust opening, the upper surface of the baffle defining a reservoir region to accumulate water transmitted through the ventilation air exhaust opening.

10. The apparatus of claim 9, wherein at least a portion of the upper surface of the baffle is inclined in the reservoir region.

11. The apparatus of claim 9, wherein a first portion of the upper surface is inclined relative to a second portion of the upper surface to define a low point in the reservoir region.

12. The apparatus of claim 8, wherein the baffle comprises an upper surface facing toward the ventilation air exhaust opening; and a drainage opening extending through the upper surface of the baffle.

13. The apparatus of claim 12, further comprising a drain having a first end and a second end, wherein the first end is connected to the drainage opening to receive water deflected by the baffle, and the second end is located to deposit the water outside the housing.

14. The apparatus of claim 13, wherein the baffle defines a reservoir region to accumulate water deflected by the baffle, the drainage opening is located in fluid communication with the reservoir region, and the drain comprises a conduit extending from the first end to the second end of the drain.

15. The apparatus of claim 13, wherein the second end of the drain is lower than the first end of the drain so that water received by the drain from the baffle is routed through the drain by gravity.

16. An apparatus, comprising:
a housing defining an interior and a ventilation opening extending through an upper portion of the housing into the interior;

a plurality of components at least partially disposed within the interior of the housing, at least one of the plurality of components including a generator set; and a baffle disposed within the housing at a location, the location being below the ventilation opening and above a portion of the generator set, wherein the baffle is positioned to obstruct an acoustic line of sight between the ventilation opening and at least a portion of the generator set to route acoustic noise from the generator set around the baffle to exit the housing through the ventilation opening, the baffle mounted to a planar heat shield positioned within the interior of the housing, wherein the baffle defines an area facing the upper portion, the area of the baffle being equal to or greater than an area of the ventilation opening.

17. The apparatus of claim 16, wherein at least one of the plurality of components further includes at least one selected from the group consisting of an engine, an electric power generator, a cooling fan, a coolant pump, a water pump, a fuel pump, a coolant heater, an air cleaner assembly, an intake air heater, an intake air cooler, an engine starter, a voltage control system, frequency control system, a sensor, and a power control system configured to control at least one of a maximum peak power output level, a sustained power output level, and a rated power output level.

18. The apparatus of claim 16, wherein the baffle is configured to deflect water transmitted through the ventilation opening to a drain.

19. The apparatus of claim 16, further comprising:
a controller at least partially disposed within the housing and configured to control an operation of at least one of the components; and
an interface coupled to the controller and configured to control an operation of the controller, wherein the interface is accessible from outside the housing through an interface access opening.

20. The apparatus of claim 19, further comprising an interface access door coupled to the housing and configured to cover the interface access opening.

21. The apparatus of claim 20, wherein the interface comprises at least one selected from the group consisting of a display panel, an electrical communication port, an optical communication port, a keypad, a push-button, a knob, and a switch.

22. The apparatus of claim 16, wherein the baffle defines a reservoir region for accumulating water transmitted through the ventilation opening.

23. The apparatus of claim 22, further comprising a drain in fluid communication with the reservoir region, wherein the drain provides a flow path for water accumulated in the reservoir region to a location outside the housing.

24. The apparatus of claim 23, further comprising a pump to convey the water from the reservoir region.

25. An apparatus, comprising
a housing including means for defining an interior space, a ventilation air intake opening intersecting the interior space and a ventilation air exhaust opening intersecting the interior space, the ventilation air exhaust opening being positioned higher than the ventilation air intake opening during nominal operation;
a generator set at least partially disposed within the interior space of the housing, the generator set being a source of acoustic noise during the nominal operation;
means for generating an air flow that draws air into the interior space from the ventilation air intake opening and lets the air out through the ventilation air exhaust opening;
means for obstructing an acoustic line of sight between the ventilation air exhaust opening and at least a portion of the generator set, the means for obstructing including a baffle mounted to a planar heat shield, the planar heat shield disposed within the interior space of the housing; and
means for routing the acoustic noise around at least a portion of the obstructing means so as to exit through the ventilation air exhaust opening.

* * * * *